United States Patent Office 3,115,217
Patented Dec. 24, 1963

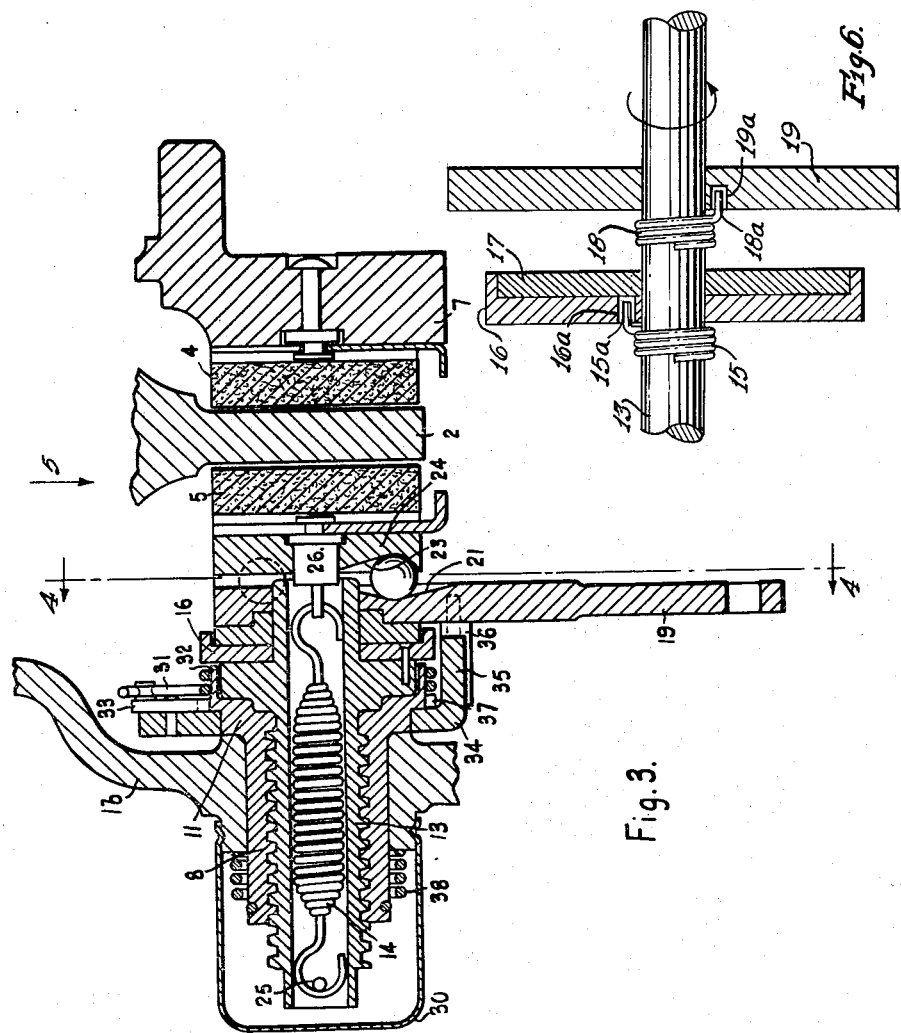

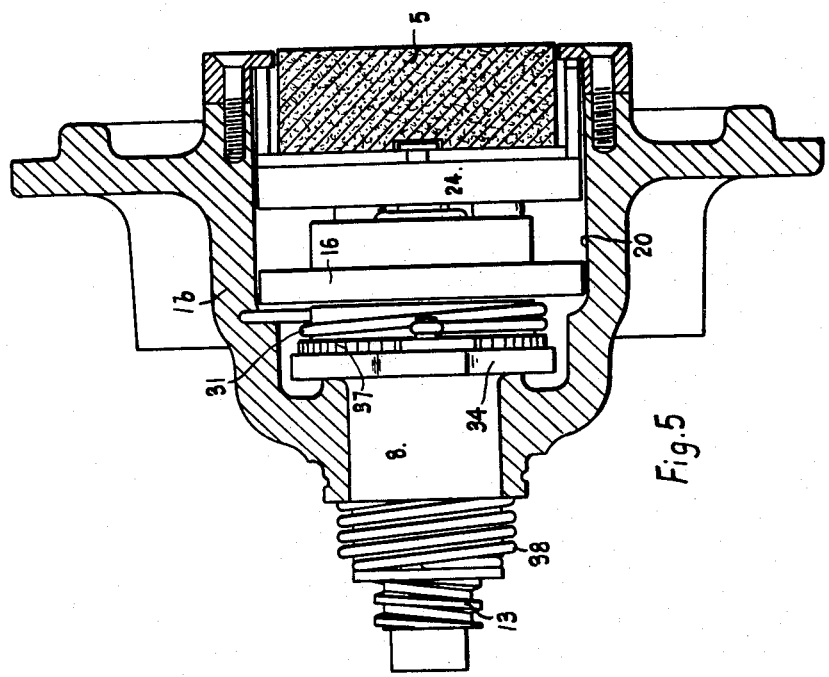
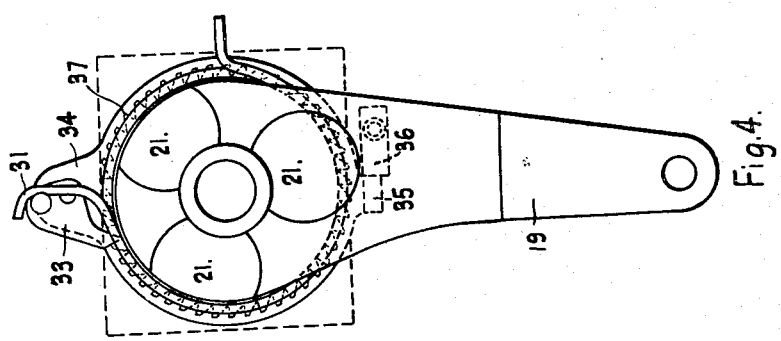

3,115,217
CAM-BALL ACTUATED SPOT BRAKE WITH
SLACK ADJUSTING MEANS
Henry James Butler, Sutton Coldfield, England, assignor to Dunlop Rubber Company Limited, London County, England, a British company
Filed June 2, 1960, Ser. No. 33,478
7 Claims. (Cl. 188—73)

The present invention relates to disc brakes and more particularly relates to a mechanically-operated disc brake suitable for application to an agricultural tractor or like vehicle.

The object of the invention is to provide an improved brake of this type.

According to the present invention a disc brake comprising an annular, axially movable and rotatable disc, a non-rotatable and axially-fixed pad of friction material to engage one braking face of the disc, a non-rotatable axially movable pad of friction material to frictionally engage the other braking face of the disc, a braking mechanism comprising an operating member angularly movable by an operator, cam or like means associated therewith to convert angular movement thereof into axial movement and thereby apply the brake and a mechanism automatically to compensate for friction pad wear on movement of the friction pad away from said disc.

The invention will now be described with reference to the accompanying drawings of which:

FIGURE 1 is a general view showing a housing for a disc brake constructed in accordance with one embodiment of the invention, FIGURE 2 is a section through the line 2—2 of FIGURE 1, FIGURE 3 is a section through a disc brake constructed in accordance with another embodiment of the invention, FIGURE 4 is an elevation on the line 4—4 of FIGURE 3. For the sake of clarity it is not presented as a true section on 4—4.

FIGURE 5 is a view on arrow 5 of FIGURE 3.

FIG. 6 is a side view, partly in section of certain elements of the brake.

Figure 1:
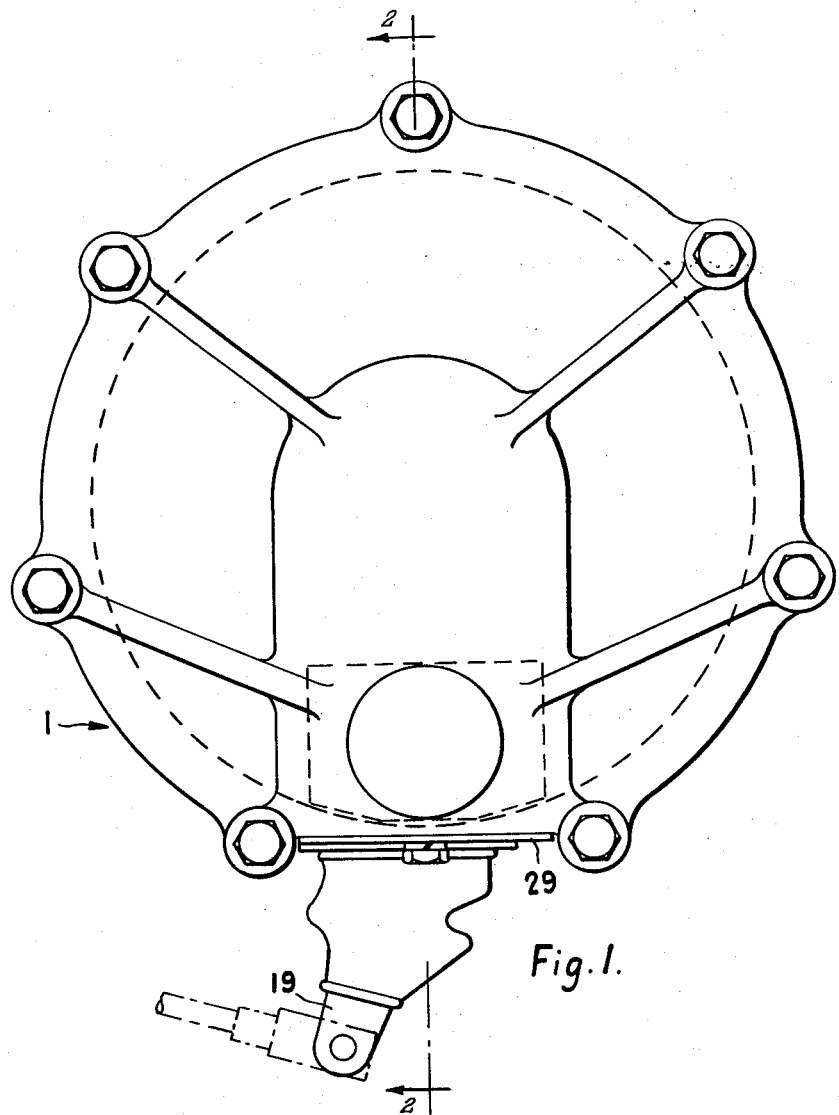

A disc brake for a tractor is housed in a non-rotatable housing 1 secured to the tractor frame and formed in two parts, inner part 1a and outer part 1b, bolted together to substantially enclose the disc 2. The inner part 1a of the housing is secured to the frame of the tractor and carries a bearing for a rotatable shaft 3. The disc 2 is splined to the shaft 3 and is rotatable with and axially slidable on it. The inner part 1a extends radially outwardly from the bearing parallel to the disc 2, and terminates adjacent the outer periphery thereof. The outer part 1b of the housing is contoured to provide clearance for the end of the shaft 3 and is also adapted to receive a braking mechanism to be described.

The braking mechanism is situated at the bottom of the housing 1 and comprises two pads 4 and 5 of friction material located co-axially on either side of the disc 2 and mechanism to enable the disc 2 to be gripped between the two pads 4 and 5. One pad 4 is secured by bonding or like means to a backing plate which in turn is secured, detachably or otherwise, to a projection 7 on the inner part 1a of the housing 1 adjacent to the braking face of the disc 2.

The mechanism for applying the brakes is mounted in a shaped portion of the outer part 1b of the housing 1. It comprises a hollow sleeve 8 within a bore of the outer part 1b and located therein by a locknut 9 (FIGURE 1) to prevent rotation thereof. The sleeve 8 has a flange 11 at the end remote from the locknut 9 which abuts the inner end of the lip of the bore in the outer housing part 1b. A coarse thread 12 is formed in the interior bore of the sleeve and a threaded member 13 is screwed therein. The threaded member 13 is formed with a bore along its axis to receive a spring 14 for a purpose to be described. The inner end of the threaded member 13 i.e. the end nearer the disc 2, is reduced in diameter to enable in turn, a first coiled helical spring 15, a locating member 16, a thrust member 17, a second coiled helical spring 18 and a lever 19 to be assembled thereon. As shown more particularly in FIG. 6, the second coiled spring 18 has one end 18a anchored in a recess 19a in the lever 19 and is thence coiled closely about the extension of the externally threaded member 13 in a clockwise direction, as viewed from the right in FIG. 6 so that, when the lever 19 is rotated counter-clockwise, relative to the member 13 as viewed from the right in FIG. 6, that is, in the direction of the arrow, the free end of the spring, having a slight frictional contact with the shaft and moving in the same direction as the lever 19 causes the coils between the ends to wind onto the member 13, decreasing in diameter, and to tighten and grip the member 13, causing the member 13 to rotate with the lever. When the lever is rotated in the opposite, clockwise, direction as viewed from the right in FIG. 6, the slight frictional contact of the free end of the spring on the member 13 causes the coils between the ends of the spring to unwind, increasing in diameter, so that the coils do not grip the member 13 but are spaced slightly therefrom, permitting the lever to return without rotating the shaft. Similarly, the spring 15 has one end engaged in a recess 16a in the non-rotatable locating member 16 and is thence coiled closely about the member 13 in a clockwise direction as viewed from the right in FIG. 6 so that, upon a counter-clockwise rotation of the member 13 relative to the locating member, that is, in the direction of the arrow in FIG. 6, the slight friction of the free end of the spring causes the coils between the ends to unwind and enlarge, releasing the member 13 to rotate freely in the direction of the arrow as it is rotated by the lever 19. When the lever 19 is rotated clockwise relative to the locating member as viewed from the right in FIG. 6, the friction of the free end of the spring on the member 13 causes this end to tighten the coils between the ends onto and to grip the member 13 and thus prevent reverse rotation of the shaft. It may be noted that when there is a counter-clockwise rotation of the member 13 relative to the free ends of the springs 15 or 18 or reversely, a clockwise movement of the springs relative to the member 13, the free ends of the springs are the leading ends and cause an unwinding and release of the member 13 from the springs and, reversely, when there is a relative rotation in the opposite direction, the free ends of the springs become the trailing ends and cause a contraction and gripping of the member 13 to the lever 19. The springs 15 and 18 thus act as a sensitive, inexpensive and reliable over-running clutch between the lever 19 and the member to permit successive rotations of the member 13 by the lever 19 and to prevent reverse movement. The over-running clutch thus formed is especially suited to the narrow space in which it is used.

The lever 19 projects from the housing 1 and is adapted to have an operating rod or cable connected to its end to move it angularly. It is provided on its inner annular face with three shallow conical ramped recesses 21 at three equiangularly spaced stations. Balls 22 are located between these recesses 21 and in three similar and complementary recesses 23 in a pressure member 24. The pressure member 24 is spring loaded on to the balls 22 by the tension spring 14 which is attached to the threaded member 13 by a pin 25 and to the pressure member 24 by a flanged cylindrical part 26 which has a short cylindrical pin 27 with an enlarged plate head 28 projecting from it on the end nearer the disc 2, and is rotatable in the pressure member 24. The projecting pin 27 and plate head 28 serve to guide a friction pad assembly, comprising of a backing plate 6 and the pad of friction material 5, which can be removed or inserted from below the housing 1. A keeper plate 29 is provided at the bottom of the housing 1 over the aperture therein for insertion or removal of the friction pad assemblies. A cover 30 of suitable flexible fabric is provided and is attached to the lever 19 and keeper plate 29 to prevent the ingress of dust or other foreign matter. A dust cover 30a is also provided over the end of the screwed member.

The operation of the brake is as follows:

The driver rotates the lever 19 thus causing the balls 22 to ride up the ramps of the recess 21 in both lever 19 and pressure member 24 and convert an angular movement into a linear one and urging the friction pad 5 to engage the disc between it and friction pad 4 in a frictional grip. The reaction of the balls 22 is taken by the lever 19, thrust washer 17 and locating member 16 to the outer part of the housing 1.

The action of rotating the lever 19 causes the second coiled spring 18, after a certain amount of lost-motion, allowed by an elongated recess in the lever 19 into which one end of the spring 18 projects, to exert a lighter torque on the threaded member 13 and move to a fresh angular position thereon. The threaded member 13 is held in position by the higher torque exerted by the first coiled spring 15. When the lever is released the spring 18 exerts a higher torque on the threaded member 13 due to the direction of winding of the spring 18 and turns the threaded member 13 in the threaded sleeve 8, thus causing it to move axially towards the disc by a small amount. The rotation of the threaded member 13 is allowed by the first coiled spring 15 as the direction of rotation is such as to lighten the torque exerted by this spring. Thus the compensation for wear takes place during the brake release operation.

Upon release of the lever the tension spring 14 pulls the pressure member 24 back so that the balls 22 return to the bottom of the recesses 21 and the friction pads 4 and 5 are disengaged from the disc 2.

The constant clearance between disc 2 and pad 5 is equivalent to the distance moved by the pressure member 24 during movement of the lever 19 allowed by the second coiled spring 18 before it begins to assume a new angular position on the threaded member 13. Thus unless the brakes are fully on by the time the lever 19 has taken up the lost movement allowed by the second coil spring 18 the mechanism will compensate for wear of the friction pads.

When the pads are fully worn the threaded member can be wound back manually to the "new pad" position.

Figure 2:
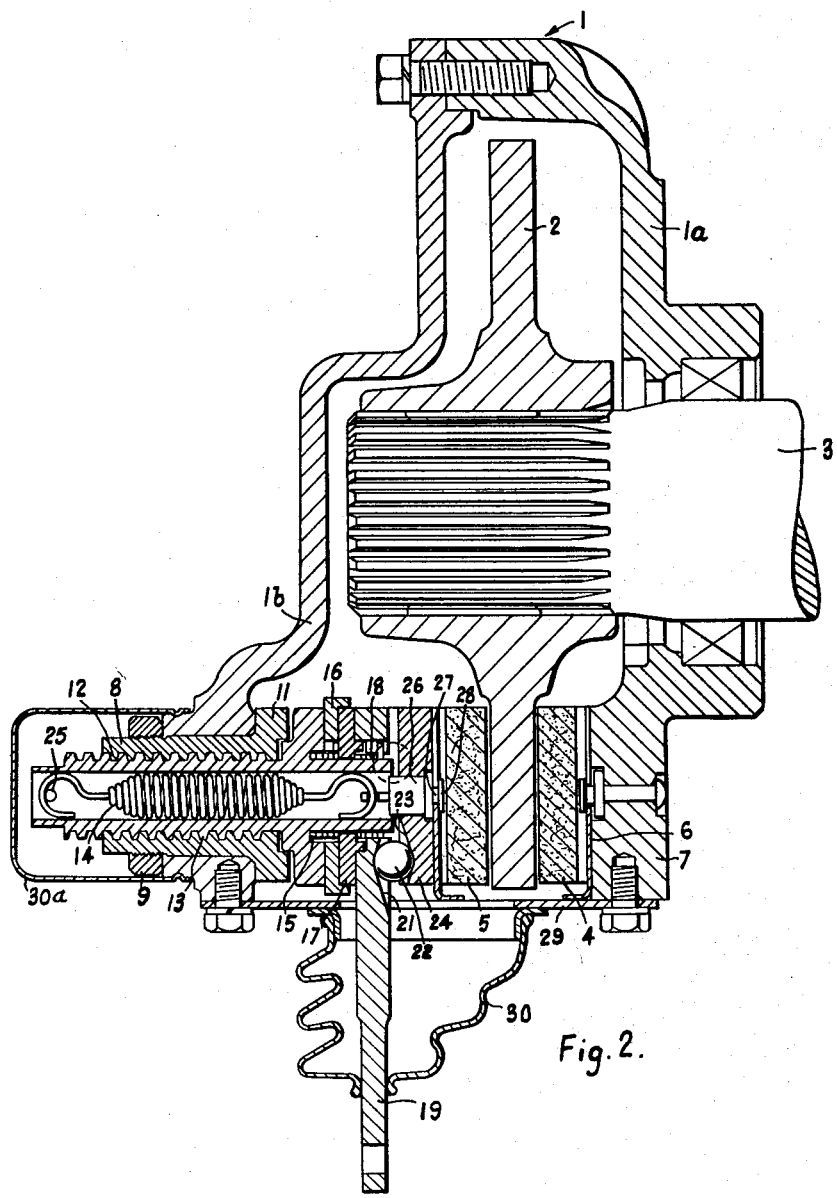

The embodiment of the brake shown in FIGURES 3, 4 and 5 is similar to that shown in FIGURES 1 and 2, the difference being in the wear take-up device. As before the angular movement of the lever 19 produces a gripping action on the disc 2, and in addition energizes a coil spring 31 wrapped around an extension 32 of the sleeve flange 11. The coil spring 31 is retained at one end by a fixed part of the housing 1 and at the other is curved to engage a pawl 33 pivotally mounted on a pawl carrier 34. The pawl carrier 34 is pivoted on the flange 11 of the sleeve and has a part 35 projecting axially inwardly to abut a buffer 36 projecting from the side of the operating lever 19. A flange 11 of the sleeve 8 is formed with raised ratchet teeth 37 on its periphery. In this embodiment the sleeve 8 is rotatable and is located by the spring 38 engaging a recess therein and loading the sleeve 8 away from the disc.

The movement of the lever 9 rotates the pawl carrier 34 until, if sufficient lever movement is available before the brake is fully applied, the pawl 33 climbs up a ratchet tooth 37 and drops into the next recess between the teeth. The spring 31 is energized during this movement and upon release of the brake it urges the pawl 33 forward and consequently the ratchet 37 and sleeve 8 around, thus advancing the threaded member 13 along the sleeve 8 to take up the excess clearance that has allowed the lever 19 to travel far enough to engage the pawl 33 in a new tooth 37.

When the friction pads 4 and 5 are completely worn the pawl 33 can be lifted and the threaded member turned backwards until there is sufficient clearance to withdraw the worn friction pad assembly and replace it with a new one, whereupon the first subsequent application and release of the brakes will set the new pad with the desired constant clearance.

Having now described my invention, what I claim is:

1. A disc brake comprising a housing, an axle rotatably mounted in said housing, a brake disc mounted on said axle within said housing to rotate therewith and slidable axially thereon, a fixed friction element mounted within said housing opposite one face of said disc, a friction element on the other side of said disc within said housing and movable axially into and out of frictional contact with the other face of said disc, a locating member mounted in said housing in axial alignment with said axially movable friction element and movable toward said disc, a cam plate between said locating member and said axially movable friction element and rotatably supported by a thrust member coaxially with said friction elements, said cam plate and said axially movable friction element respectively having opposed cam surfaces to press said axially movable friction element into frictional engagement with said disc upon rotation of said cam plate in one direction and to release said friction element from said disc upon reverse rotation of said cam plate, means to rotate said cam plate, an adjustment element for said movable friction element comprising an internally threaded member fixed on said housing, an externally threaded member supporting said locating member and rotatably threaded in said internally threaded member, and means actuated by said cam plate to rotate one of said threaded members relatively to the other upon rotation of said cam plate beyond a limit of rotation.

2. A disc brake comprising a rotatable, axially-movable disc, a non-rotatable, axially fixed housing surrounding said disc, a first friction element supported on said housing on one side of said disc to frictionally engage a braking surface of said disc and covering a minor area only of said surface, a second friction element comprising a pressure member on the other side of said disc in axial alignment with said first friction element and movable to frictional engagement with the opposed surface of said disc, an axially-movable locating member for said second friction element, an axially movable operating lever pivoted to rotate in a plane parallel to said disc between said pressure member of said second friction element and said locating member, said pressure member and said operating lever having opposed ramped recesses spaced about the pivoted axis of said lever, a plurality of balls, one for each pair of opposed recesses, located in said recesses between said operating lever and said pressure member whereby angular movement of said lever causes relative movement axially between said pressure member and said lever to move said friction element into braking contact with said disc, an internally threaded sleeve fixed on said housing, an externally threaded member rotatably threaded in said sleeve to move axially thereof upon rotation and providing a support for the reactive thrust of said lever on said locating member on the application of said brake, and means actuated by said operating lever for rotating said externally threaded member to advance said externally threaded member progressively towards said disc as wear of said friction elements occurs to maintain a constant clearance of said friction element from said disc upon retraction of said lever.

3. The disc brake of claim 1 in which said means to rotate said threaded member comprises a spring having a lost motion engagement with said cam plate and a sliding engagement with said threaded member in forward movement and a non-sliding engagement therewith on return movement and a spring positioned in said housing to permit forward movement of said threaded member and to prevent reverse movement thereof.

4. The disc brake of claim 1 in which said means to rotate said threaded member comprises a ratchet and pawl connection between said cam plate and said threaded member to engage said pawl with a successive tooth of said ratchet upon movement of said cam plate beyond a limit on forward movement of said cam plate and to rotate said threaded member upon return movement of said cam plate.

5. A disc brake according to claim 2 wherein said means to advance said externally threaded member comprises a clutch spring encircling the threaded member and having a lost motion coupling with the operating lever, said spring being adapted to reset itself on the threaded member upon angular movement of the lever member beyond said lost motion coupling and to grip and rotate said threaded member to advance the threaded member during the return movement of the lever member to its inoperative position.

6. A disc brake according to claim 2 wherein said means to advance said externally threaded member comprises a pair of clutch springs, encircling the threaded member, one of the springs having a lost motion connection to the operating lever and a sliding connection with said threaded member on angular movement of said lever beyond said lost motion to bring about said frictional engagement and a non-sliding engagement therewith on return movement, the other spring being arranged to permit movement of the threaded member towards the disc and to prevent movement thereof away from said disc.

7. A disc brake according to claim 1 wherein said means to advance said externally threaded member comprises a ratchet and pawl connection between said lever and said threaded member, said pawl being adapted to engage with a successive tooth of said ratchet upon movement of said lever beyond a predetermined limit to bring about said frictional engagement and to advance said threaded member during the return movement of the lever to its inoperative position.

References Cited in the file of this patent

UNITED STATES PATENTS

| | | |
|---|---|---|
| 2,505,238 | Frola | Apr. 25, 1950 |
| 2,612,969 | Hawley | Oct. 7, 1952 |
| 2,669,327 | Chamberlain et al. | Feb. 16, 1954 |
| 2,820,530 | Chouings et al. | Jan. 21, 1958 |
| 2,835,354 | MacDougall | May 20, 1958 |
| 2,915,147 | Davis | Dec. 1, 1959 |
| 2,983,338 | Vansteenkiste | May 9, 1961 |
| 2,997,137 | Hodkinson | Aug. 22, 1961 |
| 3,042,152 | Butler | July 3, 1962 |
| 3,059,731 | Gancel et al. | Oct. 23, 1962 |